United States Patent [19]

Kull

[11] 3,991,788
[45] Nov. 16, 1976

[54] FLUID FLOW DISTRIBUTOR FOR MULTI-CHOICE VENDING MACHINE
[75] Inventor: Leo Kull, West Caldwell, N.J.
[73] Assignee: Coffee-Mat Corporation, Kenilworth, N.J.
[22] Filed: Aug. 28, 1975
[21] Appl. No.: 608,520

[52] U.S. Cl. .............................. 137/608; 137/609; 137/637.1; 251/331
[51] Int. Cl.² ........................................ F16K 11/18
[58] Field of Search ............. 137/625.48, 607, 608, 137/609, 612.1, 596.15, 637.1

[56] References Cited
UNITED STATES PATENTS

| | | | |
|---|---|---|---|
| 2,519,448 | 8/1950 | Fairchild | 137/607 X |
| 2,781,780 | 2/1957 | Zahradka | 137/608 |
| 2,911,005 | 11/1959 | Adelson | 137/596.15 |
| 2,950,737 | 8/1960 | Hendrix | 137/625.48 |
| 3,019,815 | 2/1962 | Lenardon et al. | 137/612.1 |

FOREIGN PATENTS OR APPLICATIONS

| | | | |
|---|---|---|---|
| 1,263,280 | 5/1961 | France | 137/609 |
| 280,612 | 5/1952 | Switzerland | 137/607 |

Primary Examiner—William R. Cline
Attorney, Agent, or Firm—William R. Liberman

[57] ABSTRACT

A selectively operated multiple output flow distributor includes a circular head block having a central input port and a plurality of peripherally spaced outlet ports terminating in a valve seat. A resilient circular diaphragm underlies the head block and is provided with raised valve-defining bosses registering with the outlet ports, and its border is sandwiched between the confronting peripheral border of the port block and an underlying block slidably carrying valve stems registering with each of the bosses and either spring-urged to a raised valve-closing position or unbiased to be retracted normally from the port in a valve-open position. A mechanism including either motivating solenoids or a hand or motor-controlled circular cam selectively actuates the valve stems to open or close respective valves.

13 Claims, 8 Drawing Figures

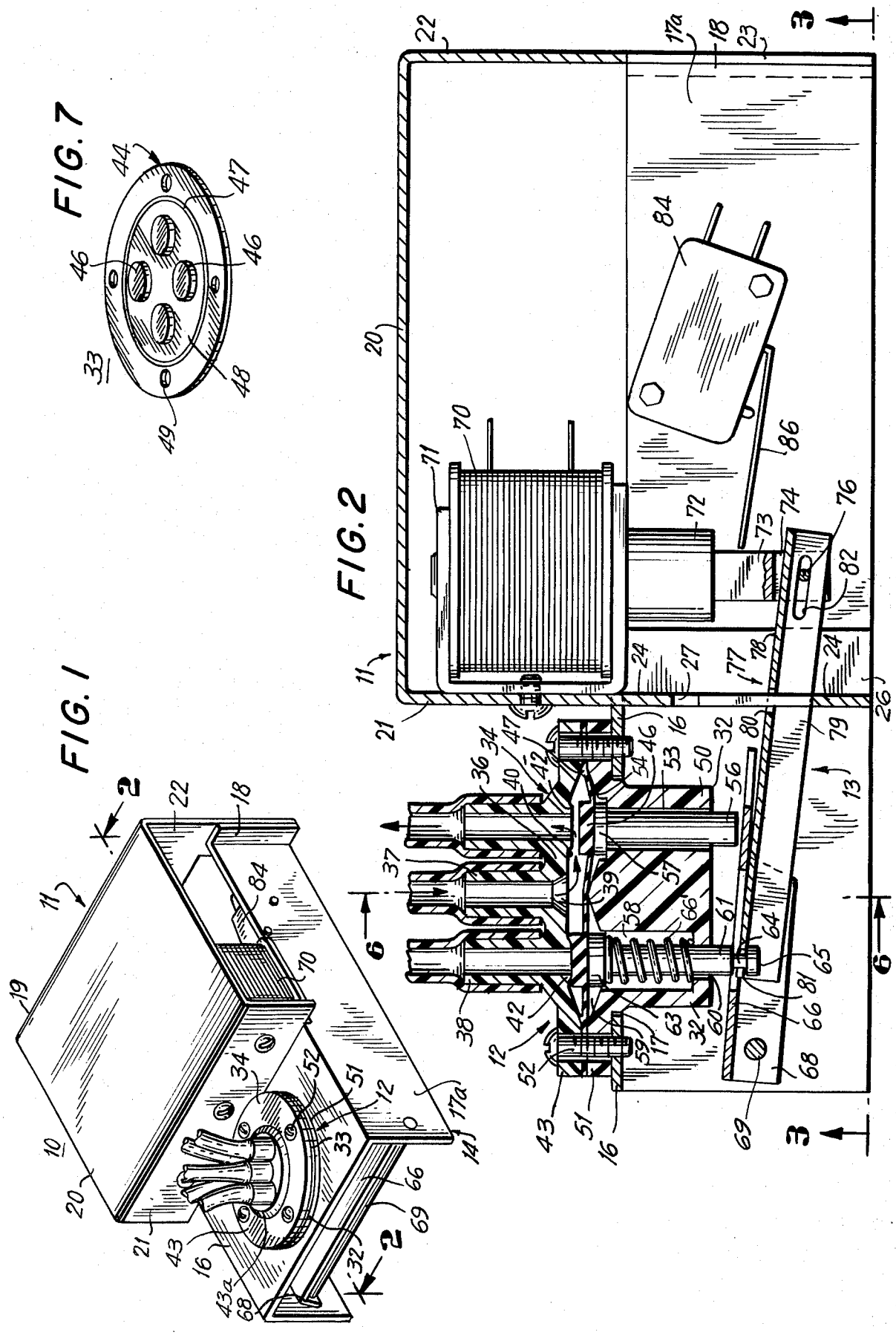

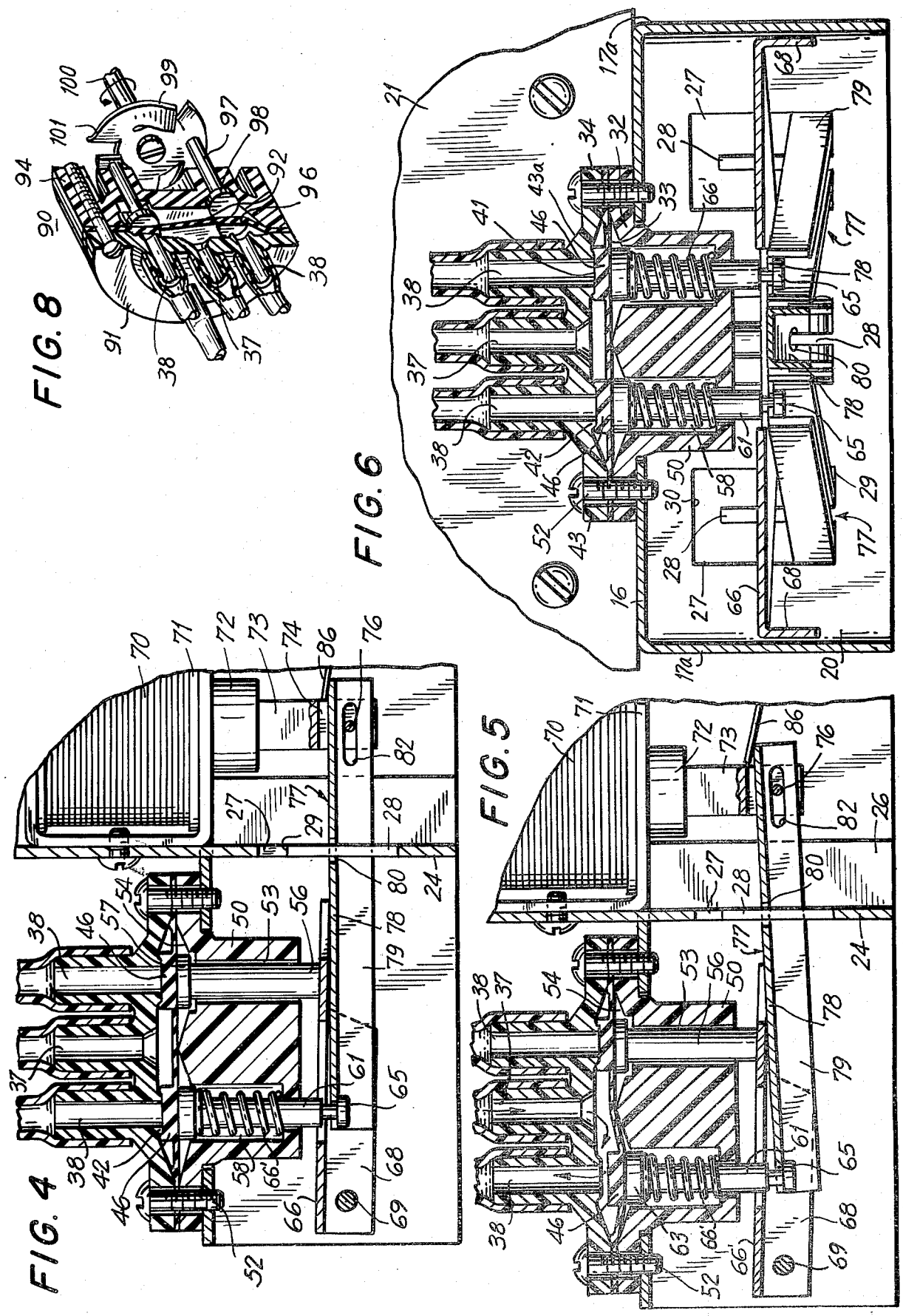

FLUID FLOW DISTRIBUTOR FOR MULTI-CHOICE VENDING MACHINE

BACKGROUND OF THE INVENTION

The present invention relates generally to improvements in valve devices and it relates more particularly to an improved multiple outlet liquid distribution valve device.

In multi-drink vending machines in which a drink preselected from a group of drinks is prepared and dispensed, there is ordinarily provided a series of mixing bowls, a corresponding one of which simultaneously receives water and a respective powdered drink concentrate then mixed in the bowl to produce the drink. The water for the various bowls generally comes from a common source and must be directed into the selected mixing bowl, and with this bowl selection activation the powder-dispensing motor is started. For a two-selection control, a two-way solenoid valve is commonly used. However, a three-selection control requires two solenoid valves connected in series, and for each additional drink selection one more solenoid valve connected in series is required. While the above system is acceptable for a two- or three-drink selection machine, beyond this number this liquid distributing system possesses numerous drawbacks and disadvantages. There is an excessive restriction to the flow of water through all the valves necessitating the provision of restrictor valves in the lines with less valve restriction to achieve equal amounts of water. Further, because of the long path of water movement through three deflector valves the restriction may cause unequal amounts of water to be delivered to the dispensing cup. The electrical control required with a connector for each valve unit is complex and bulky, resulting in a crowded chassis, and the assembled system is expensive. The presently used systems are frequently unreliable and of limited versatility and adaptability, and otherwise leave much to desired.

SUMMARY OF THE INVENTION

It is a principal object of the present invention to provide an improved valve device.

Another object of the present invention is to provide an improved liquid distributing valve system.

Still another object of the present invention is to provide an improved selectively actuated multiple outlet valve.

A further object of the present invention is to provide an improved device of the above nature characterized by its reliability, optimum flow properties and low flow restriction, ruggedness, simplicity, compactness, ease of installation and maintainance, low cost, and high versatility and adaptability.

The above and other objects of the present invention will become apparent from a reading of the following description taken in conjunction with the accompanying drawings which illustrate preferred embodiments thereof.

In a sense, the present invention contemplates the provision of a selective multiple-outlet fluid distribution valve device comprising a head member having a first face with a multiplicity of spaced valve seat-defining first ports, a flexible diaphragm hermetically sealed to the head member and defining with the front face a fluid distributing chamber, the diaphragm having a second or inner second face confronting the first face and having valves registering with respective valve seats, and individually movable with the corresponding flexing of the diaphragm to closed and open positions engaging and disengaging respective valve seats, and a valve actuating mechanism for selectively moving the valves between their open and closed positions.

In the preferred form of the present invention, the first face is circular and is surrounded by an axially forwardly offset shoulder and has formed therein a central inlet port, the valve seat defining outlet ports are arranged in a circle about the inlet port and each outlet port is bordered by a peripheral upstanding lip. The valves are in the form of cylindrical projections on the diaphragm coaxial with respective valve seats. A cylindrical base member having a peripheral flange underlying the head member shoulder is screw-mounted thereto and the border of the diaphram is tightly sandwiched between the shoulder and flange. Longitudinal bores are formed in the base member coaxial with respective valves, and valve rods coaxially slidably register with the bores, some of the rods being spring-biased toward the valves normally to close the respective valves. The valve actuating means includes a group of levers engaging the valve rods and corresponding solenoids for rocking the levers between open and valve closed positions in accordance with the condition of energization of the respective solenoids. An alternative valve actuating mechanism includes a circular cam engaging the end faces of each valve rod, and actuating the valves in response to the position of the cam. The cam may be manually or motor-rotated.

The improved liquid distributor multi-outlet valve device of the present invention is compact, rugged, reliable, and of great versatility. The liquid flow paths between the valve inlet and the valve outlets are substantially equal and of minimum restriction.

BRIEF DESCRIPTION OF THE DRAWINGS

FIG. 1 is an end perspective view of a valve device embodying the present invention;

FIG. 2 is a sectional view along the line 2—2 in FIG. 1;

FIG. 4 is a fragmentary view similar to FIG. 2 but showing the solenoid plunger in a partially retracted position;

FIG. 5 is a view similar to FIG. 4 but showing the solenoid plunger in a fully retracted position;

FIG. 6 is a sectional view along line 6—6 in FIG. 2;

FIG. 7 is a top perspective view of the valve diaphragm member; and

FIG. 8 is a fragmented perspective view of another embodiment of the present invention.

DESCRIPTION OF THE PREFERRED EMBODIMENT

Figure 3:
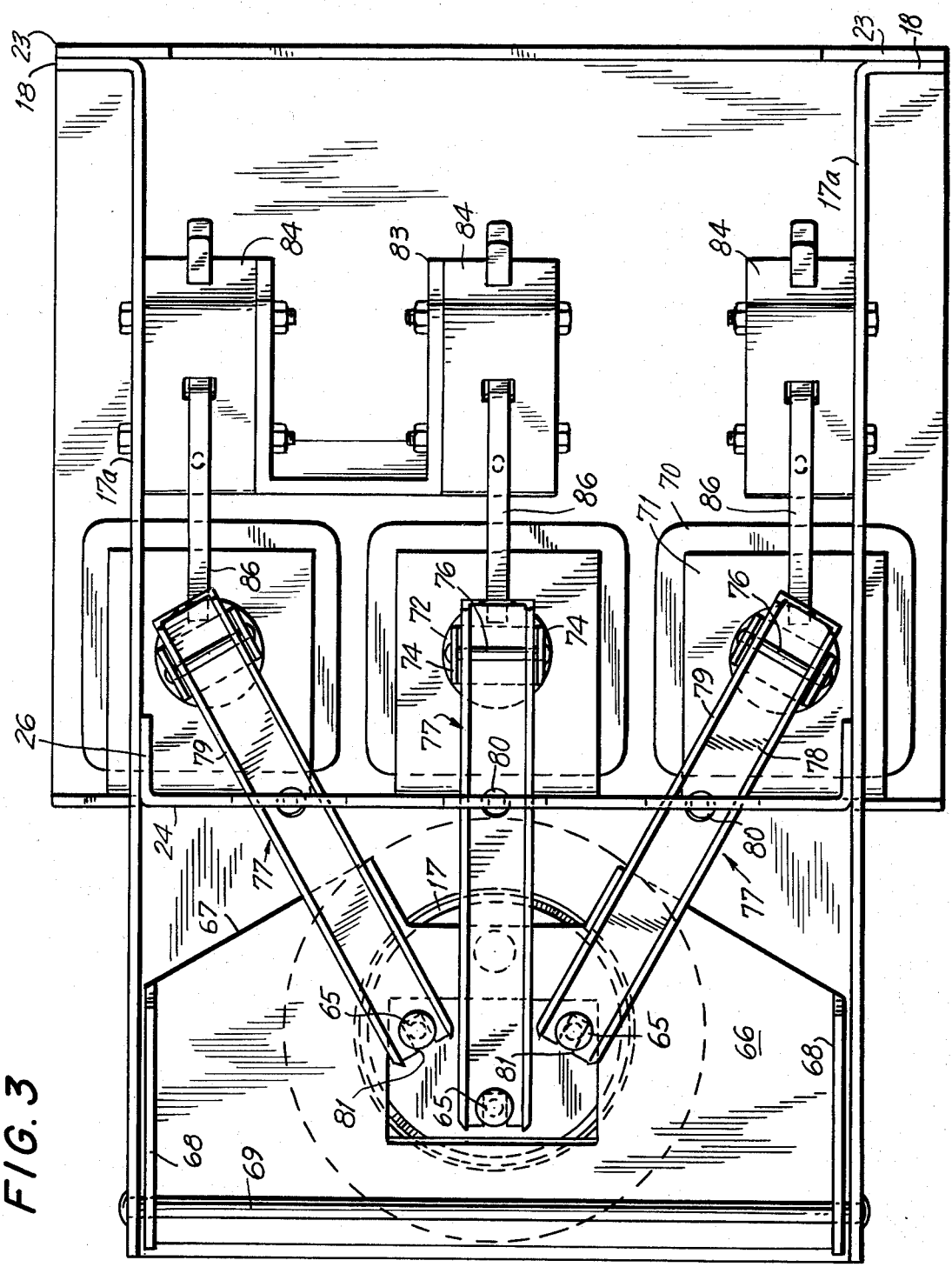
FIG. 3 is a bottom plan view along the line 3—3 in FIG. 2.

Referring now to the drawings, and particularly to FIGS. 1 to 7 thereof, which illustrate a preferred embodiment of the present invention, reference numeral 10 designates generally the improved liquid distributing valve device which comprises a mounting frame 11, a valve assembly 12, and a valve actuating mechanism 13.

Mounting frame 10 comprises a bottom section 14 including a transversely extending horizontal top plate 16 having a centrally disposed circular opening 17 and depending vertical parallel flat side arms 17a which extend from the front edge of plate 16 rearwardly to the rear edge thereof, the ends of side arms 17a terminating in outwardly directed coplanar vertical flanges 18. Mounted atop the rear portion of bottom section 14 is a top section 19 which includes a horizontal top plate 20 wider than the plate 16 and terminating along its full front and rear edges in depending front and rear vertical wall members 21 and 22. Depending from the side borders of rear wall 22 are vertical legs 23 which extend along and are secured to flanges 18.

Depending medially from front wall 21 along the rear edge of plate 16 and the inside faces of arms 17a is a vertical wall 24 which terminates along its side edges in rearwardly directed vertical flanges 26 which extend along and are secured to the inside faces of arms 17a. Formed in vertical wall 21 intermediate its top and bottom are three transversely spaced vertically elongated rectangular openings 27. A vertical retaining leg 28 is integrally formed with the bottom edge 29 of each opening 27 and projects vertically medially therefrom to a point short of the top edge 30 of each opening 27.

Valve assembly 12 is mounted on plate 16 in registry with circular opening 17, and comprises a lower base member 32, a valve diaphragm 33 and an upper head member 34. Head member 34 is formed of any suitable rigid material and includes a horizontal circular body portion 36 provided with a coaxial integrally formed upwardly directed tubular inlets nipple 37, and four upwardly directed outlet tubular nipples 38 integrally formed with body portion 36 and arranged in a circle about inlet nipple 37, each extending the height of inlet nipple 37, it being understood that while four outlet nipples as 38 are shown more or fewer than four outlet nipples as 38 may be provided. Inlet nipple 37 is connected by a flexible tube, in a drink vending machine, to a source of metered water and the outlet nipples 38 are connected by flexible tubes to corresponding mixing chambers. Inlet nipple 37 communicates with a coaxial tapered inlet port 39 at the underface 40 of body portion 36, and each outlet nipple 38 communicates with outlet port 41 at the underface 40, each outlet port 41 being surrounded by a coaxial dependent valve seat-defining peripheral lip 42. An outwardly directed horizontal peripheral flange 43 is below the level of body portion underface 36, and is joined to the body portion by an upwardly, inwardly inclined shoulder portion 43a.

Valve diaphragm 33 is formed preferably of a flexible deformable resilient material, for example, polyethylene or polypropylene of 50 Duro hardness, and is normally in the shape of a flat disc 44 of diameter equal to the outside diameter of peripheral flange 43. Projecting upwardly from the top face of disc 44 and arranged in a circle about the center thereof, at spacings corresponding to the relative positions of valve seats 42 are valve-defining shallow cylindrical projections 46 having diameters slightly greater than the outside diameters of valve seats 42. A concentric upwardly projecting circular sealing lip 47 is integrally formed with the top face 48 of disc 44, and a plurality of screw-receiving holes 49 are formed in the border of disc outside lip 47. Diaphragm 33 coaxially underlies head member 34, with its border engaging the underface of the peripheral flange 43, top face 48 spaced below the underface 40 of the head, the cylindrical valves coaxially registering with and normally spaced below the valve seats 42, openings 49 registering with corresponding openings in flange 43, and circular lip 47 engaging the inclined face bordering the inner edge of the underface of flange 43.

Base member 32 is formed of any suitable rigid material and includes a cylindrical body portion 50 coaxially depending through plate opening 17, and having an upper horizontal peripheral flange 51 of the configuration of the flange 43 and resting on the top face of plate 16 bordering opening 17. The top face of peripheral flange 51 is flat and the border of the diaphragm disc 44 is tightly sandwiched between the confronting faces of flanges 43 and 51, and the assembly of the head and the base members 34 and 32 and the diaphragm 33 are fastened together and secured to the plate 16 by screws 52 registering with axially aligned openings in flanges 43 and 51 and the diaphragm holes 49, and engaging tapped openings in plate 16 bordering opening 17.

Formed in body 50 proximate the rear thereof is a vertical bore 53 coaxial with the rearmost valve member 46 and counterbored at its top, communicating with a shallow conical well 54 in the top face of body 50. A valve rod 56 slidably coaxially engages bore 53 and depends below the bottom thereof, rod 56 terminating at its upper end in a flat topped cylindrical head 57 of about the size and shape of the valve 46 and normally nesting in the counterbored top of the bore 53.

Also formed in base body 50 coaxial with the remaining three valves 46 other than the valve 46 coaxial with bore 53 are three cylindrical wells 58 which terminate at their tops in enlarged shallow conical wells 59, having coaxial bores 60 in their bases communicating with the underface of body 50. Slidably engaging each bore 60 and depending below the bore, and extending through the respective well 58, is a cylindrical valve rod 61 terminating at its top in an enlarged cylindrical head 63 corresponding to head 57, and at its bottom in a depending coaxial shank 64 of reduced diameter terminating in a button 65. A helical compression spring 66' engages each valve rod 64 and is entrapped between the confronting faces of the respective head 63 and the base of the well 58 to raise the rod 58 and head 63 resiliently to bear against the underface of the overlying valve 46, and raise it into closing engagement with a respective valve seat 42.

The valve actuating mechanism 13, in the illustrated embodiment, includes a rocker plate 66 extending between the forward portions of arms 17 and underlying valve assembly 12. Rocker plate 66 extends rearwardly of valve rod 56 and terminates as its rear in an edge 67 which converges rearwardly to a medial arcuate section. The side edges of plate 66 are parallel and proximate arms 17, and vertical flanges 68 depend from these side edges. The rocker plate 66 is swingably connected between front portions of arms 17 by an axle 69 extending transversely between arms 17 and engaging transversely aligned openings in the forward portions of flanges 68.

Located on front wall 21 of the mounting frame below top wall 20 are three transversely spaced vertical solenoids 70 which are secured to the inside face of wall 21 by rearwardly directed U-shaped brackets 71 screwed to the wall 21 and embracing respective solenoids 70. Associated with each solenoid 70 and coaxial therewith is a normally depending armature plunger 72 which is raised upon the excitation or electrical energization of the respective solenoid 70. Depending from and secured to the underface of each plunger 72 is a vertical bracket 73 terminating in a pair of depending parallel transversely spaced legs 74 supporting between them a transverse pivot pin 76.

Extending from the side and front valve rods 61 below rocker plate 66 to brackets 73 on the plungers of respective side and medial solenoids 70 are connector arms or levers 77 which are normally downwardly rearwardly inclined, with middle lever 77 engaging the middle solenoid plunger extending medially longitudinally and the other two levers 77 diverging rearwardly. Each lever 77 is channel shaped including a top cross web 78 and parallel vertical side flanges 79. Levers 77 extend through respective openings 27 in wall 24 with flanges 79 normally resting on the opening bottom edges 29, and each cross web 78 having an enlarged opening 80 formed therein which loosely engages a corresponding retaining leg 28 in an opening 27. A short medial longitudinal slot 81 is formed in the leading edge of each cross web 78 and engages a respective valve rod shank 64, the web bordering the slot 81 resting on button 65. A pair of parallel longitudinal slots 82 are formed in the rear portions of the lever flanges 79 of each lever 77 and slidably engage a corresponding pivot pin 76.

Between the frame side walls 17 rearwardly of solenoids 70, there are mounted, in a suitably received bracket as 83, two spaced switches 84 provided with actuating arms 86 whose free ends are disposed in the upward paths of the rear portions of lever cross webs 78. The third switch is secured directly onto the opposite side wall 17a.

Considering now the operation of valve device 10, solenoids 70 are connected to the electrical central network of the drink vending machine or of any other machine in which a liquid is to be distributed to preselected points, in the dormant position of valve device 10 with solenoids 70 being unexcited, the valve device is in the condition shown in FIG. 2, with plungers 72 in their lowered positions and rocker plate 66 and arms 77 being in their downwardly swung positions. Valve rod 56 is disengaged by rocker plate 66 which permits it to drop to a position effecting the opening of rear valve 46, and valve rods 61 are raised under the influence of springs 66 to raise the corresponding valves 46 to their closed positions engaging respective valve seats 42.

Upon energization of one of the solenoids 70, the corresponding plunger is raised to its retracted position. As the plunger 72 travels upwardly to a position below the top of its travel, as shown in FIG. 4, arm 77 is swung upwardly about a corresponding button 65 depending from a valve rod 61 maintained raised by a spring 66, the upwardly swinging arm 77 engaging the rocker plate 66 rear edge 67 to swing the rocker plate 66 upwardly about axle 69 thereby to engage and raise valve rod 56 and to close the respective valve 46 under the action of the valve rod head 57. With the closure of valve 46 further raising of the valve rod 56 and hence of the rocker plate 66 is prevented. Also, raising plunger 72 to its fully raised position as shown in FIG. 5 causes the respective arm 77 to swing counter-clockwise about the rocker arm rear edge 67 to lower the face end of arm 77 which bears downwardly on a button 65 to lower the respective valve rod 61 and head 63 against the influence of spring 66 and open corresponding valve 46. Thus, with all the solenoids 70 deenergized, forward valve 46 is open and the remaining valves 46 are closed, and upon the energization of any of the solenoids 70 the valve 46 is first closed and a corresponding other valve 46 is immediately thereafter opened. With the upward travel of an arm 77, a corresponding switch arm 86 is engaged and raised to actuate the respective switch 84 and control an operational sequence of the machine. Liquid entering the valve device through inlet nipple 37 thus flows by short equal paths to any preselected outlet nipple 38.

In FIG. 8 of the drawings there is illustrated another embodiment 90 of the present invention which differs from that first described in that the valve rods are not spring biased to the valve closed positions and the valve actuating mechanism is of different construction. Specifically, the modified valve assembly includes a head member 91, a valve diaphragm 92, and a base member 94 which are assembled in the manner of the first embodiment, head member 91 and valve diaphragm 92 are of the same construction and relationship as those of head member 34 and diaphragm 33.

Base member 94 has longitudinal bores coaxial with respective valves 96 on valve diaphragm 92 and slidably engaging valve rods 97 terminating at their inner ends in enlarged heads 98 nestable in counterbores, the outer ends of the rods defining cam followers. A circular end face cam 99 confronts the follower ends of valve rods 97 and has a cam end face engaging the follower ends, cam 99 being coaxial with the valve device and mounted on a rotatable shaft 100. Cam 99 has four peripherally spaced cam sections 101 each engaging a corresponding valve rod and being so shaped as to permit the retraction of one preselected rod 97 at a time to open the corresponding valve 96 while keeping the remaining valve rods 97 advanced and the respective valves 96 closed, the valve which is open being responsive to the angular position of the cam 99. The rotation of the shaft 100 and cam 99 may be achieved by an electric motor or manually. Cam 99 may of course be shaped to achieve any desired sequence of opening and closing of the valves 96.

While there have been described and illustrated preferred embodiments of the present invention, it is apparent that numerous alterations, omissions and additions may be made without departing from the spirit thereof.

I claim:

1. A fluid distributor device comprising a head member having a first face provided with an inlet port and a plurality of spaced first valve seats defining first outlet ports and a second valve seat defining a second outlet port, a flexible diaphragm hermetically sealed to said head member and having a second face confronting and axially spaced from said first face and having first and second valves registering with respective first and second valve seats and movable to closed and open positions engaging and disengaging respective valve seats, said first valves being normally in closed engagement with corresponding first valve seats and said second valve being normally in open disengagement with said second valve seat, and valve actuating means including a plurality of solenoids and means coupling each of said solenoids to a respective first valve for opening a corresponding first valve in response to the energization of said solenoid and means responsive to the opening of one of said first valves for closing said second valve.

2. The fluid distributor device of claim 1, said outlet ports being circumferentially spaced about and radially spaced from said inlet port.

3. The fluid distributor device of claim 2, wherein said first face is circular and said head member includes an annular section coaxial with and forwardly offset from said first face, the border of said diaphragm engaging said annular section.

4. The fluid distributor device of claim 1, wherein each of said valves comprises a projection integrally formed on said diaphragm second face of greater diameter than and projecting toward a respective first port.

5. The fluid distributor device of claim 4, wherein said valves are of cylindrical configuration and coaxial with respective first ports.

6. The fluid distributor device of claim 5, wherein each of said ports includes a forwardly projecting peripheral lip defining a respective valve seat.

7. The fluid distributor device of claim 1, wherein said valve actuating means comprises a base member secured to said head member and having longitudinally extending bores coaxial with respective pairs of said valves and valve seats, and a plurality of valve rods, each valve rod being coaxially slidable in a respective bore between an advanced position bearing on said diaphragm and closing the respective coaxial port and a retracted position effecting the movement of the retraction of the respective valve and the opening of the coresponding port.

8. The fluid distributor device of claim 7, including spring means biasing at least some of said rods to their advanced position.

9. The fluid distributor device of claim 7, including a plurality of tube coupling nipples integrally formed with and projecting longitudinally from said head memeber and communicating with respective ports.

10. The fluid distributor device of claim 7, wherein said valve actuating means comprises, a plunger motivated by each of said solenoids, and first levers coupling said plungers to respective first valve rods axially sliding said valve rods with the energization of corresponding solenoids.

11. The fluid distributor of claim 10 wherein said valve actuating means comprising a second lever engaging said second valve engaging rod and coupled to said first levers whereby rocking of any of said first levers to open a respective first outlet port rocks said second lever to close said second outlet port.

12. The fluid distributor device of claim 7, wherein said valve actuating means comprises a circular cam coaxial with said valves and having peripherally spaced rise portions engaging the outer end faces of said valve rods, and menas for rotating said cam.

13. The fluid distributor device of claim 7, wherein each of said valves comprises a cylindrical projection integrally formed on said diaphragm face, and each of said ports includes a forwardly projecting peripheral lip of lesser diameter than said respective valves and defining said valve seats.

* * * * *